UNITED STATES PATENT OFFICE.

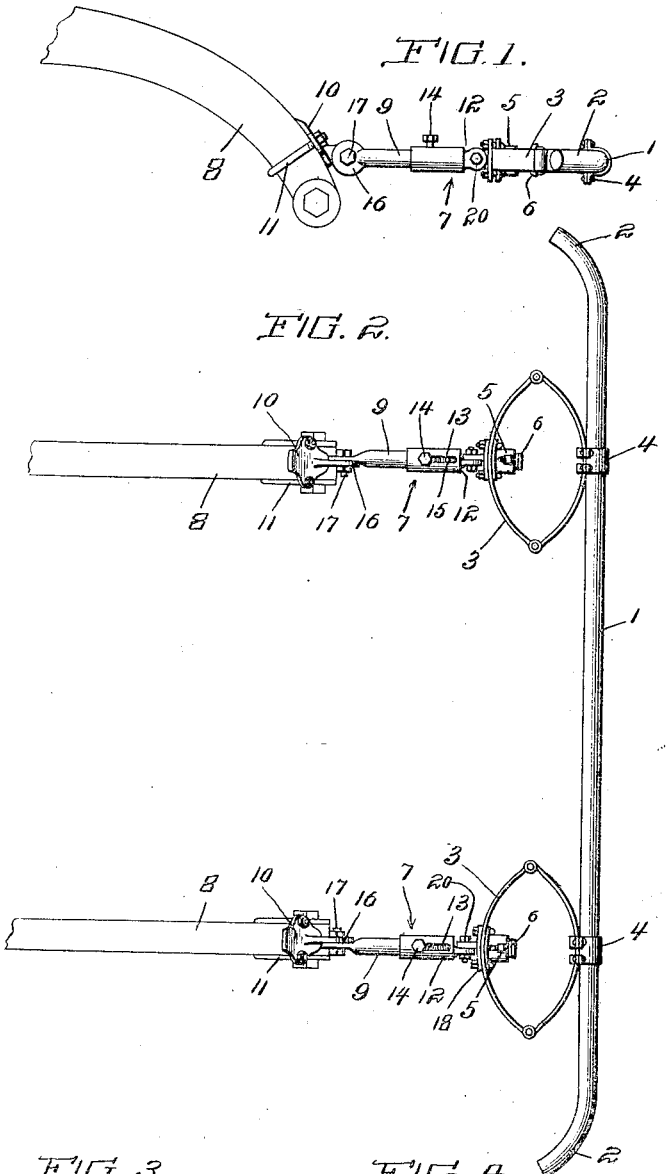

HENRY S. HENDERSON, OF EAGLE ROCK, VIRGINIA.

AUTOMOBILE-BUMPER.

1,189,106.  Specification of Letters Patent.  Patented June 27, 1916.

Application filed September 15, 1915. Serial No. 50,857.

*To all whom it may concern:*

Be it known that I, HENRY S. HENDERSON, citizen of the United States, residing at Eagle Rock, in the county of Botetourt and State of Virginia, have invented new and useful Improvements in Automobile-Bumpers, of which the following is a specification.

This invention is an improved automobile bumper, the object of the invention being to provide an improved device of this character which may be readily attached to the front ends of the side bars of the chassis and which is provided with cushioning springs which support the bumper rod and is also provided with cushioning telescoping and pivotally jointed arms which support the bumper rod and the cushioning springs and enable the rod to be adjusted vertically as may be desired and also serve to cushion the bumper rod and lessen the stroke thereof in the event that a person or object is struck thereby.

The invention consists in the construction, combination and arrangement of devices hereinafter described and claimed.

In the accompanying drawings:—Figure 1 is a side elevation of an automobile bumper constructed in accordance with my invention and showing the same attached to the downturned ends of the side bars of an automobile chassis. Fig. 2 is a plan of the same. Figs. 3—4 are detail sectional views of the same.

The bumper rod 1 has rearwardly turned ends 2 and provided on its rear side at suitable points with cushioning elliptical springs 3 each of which has its front side secured to the bumper rod by a suitable clip 4. At the rear side of the spring 3, at the center, is a cushioning member 5 which comprises a plunger member 6 and a tubular member 5ª. The tubular member is open at its front end and the plunger member is fitted for reciprocating movement in the tubular member and is provided at the front end with a notch or seat 6ª for the reception of the front member of the spring when the latter is under stress and to prevent the front member of the spring and the bumper rod from being deflected upwardly or downwardly. A stop pin 6ᵇ with which the member 6 is provided operates in a slot 5ᵇ in one side of the tubular member. A cushioning spring 6ᶜ bears between the inner end of the member 6 and the tubular member 5. Said member 5 is secured to the spring 3 and also to an attaching clip 18 by means of U-bolts 19, the member 5 being on the front side of the rear leaf of the spring and the attaching member 18 being on the rear side of said rear leaf. Arms 7 connect the centers of the rear members of the spring 3 with the downturned front portions 8 of the chassis, each of said arms 7 comprising a rear member 9 which has a foot or base 10 secured as by means of a clip bolt 11 on one of the chassis side bars, each arm also having a tubular front member 12 in which the rear member 9 is telescopically fitted. Each member 12 is connected by a hinge joint 20 to one of the attaching members 18 and has a longitudinal slot 13 which is engaged by a set screw 14 secured to the rear member 9. A coiled spring 15 is in the front end of each tubular member 12 and bears against the front end of the rear member 9.

The rear member 9 of each arm is provided with a hinge joint 16 including a clamping bolt 17 which enables the arms to be set at any desired vertical adjustment and either horizontal or at any desired inclination and to be then secured in such adjusted position.

Having thus described my invention, I claim:—

In an automobile bumper, a bumper rod, elliptical cushioning springs on the rear side of and each having its front member secured to said rod, each of said springs having a bumper member on its rear member, provided with a seat for engagement by the front member when the spring is under compression, and arms secured to the rear sides of said spring and provided with means for attaching said arms to the frame of an automobile In testimony whereof I affix my signature in presence of two witnesses.

HENRY S. HENDERSON.

Witnesses:
M. R. MORGAN,
W. B. MILTON.